United States Patent Office 3,429,401
Patented Feb. 25, 1969

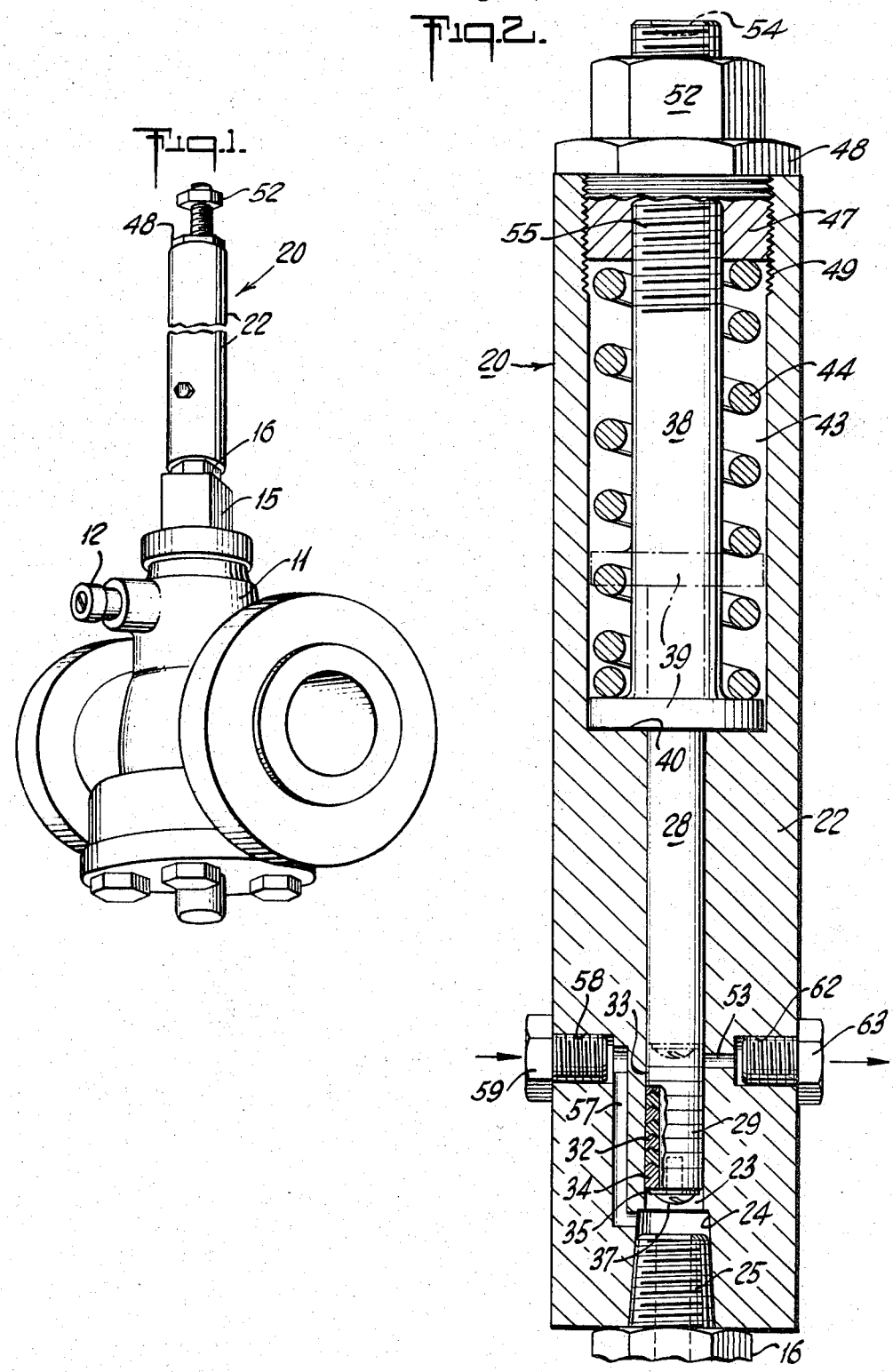

3,429,401
PENETRATING-FLUID INJECTOR
Charles D. Johnson, Port Arthur, Tex., assignor to Texaco Inc., New York, N.Y., a corporation of Delaware
Filed Aug. 30, 1966, Ser. No. 576,155
U.S. Cl. 184—45          1 Claim
Int. Cl. F16n *11/04, 17/00;* F16j *15/56*

This invention concerns an injector, and more specifically relates to a penetrating-fluid injector that is especially applicable for use in applying a fluid to the internal movable surfaces of valves or the like when such surfaces have become stuck.

It has been found that valves and particularly high pressure plug type valves, such as those employed in high temperature and/or high pressure applications, have a tendency for the packing and/or lubricant for the valve stem and valve body proper to become hardened and consequently to cause the parts to become frozen so that the valve becomes inoperable. Such action may have taken place by reason of chemical hardening of the lubricant or packing; and, while it has been found that such frozen lubricant and packing may be softened by application of a flaming torch in the packing gland area, this clearly is not feasible in many if not most installations. Therefore, the solution to unfreezing a stuck valve heretofore has been to dismantle the valve, which means removal thereof from operation not to mention the time and effort involved in the dismantling and removal of the frozen packing and/or lubricant.

Consequently, it is an object of this invention to provide an injector which may be employed to inject under substantial pressure a penetrating fluid which may act chemically so as to soften and free frozen parts without dismantling or removal of the unit, e.g. valve, from use.

Another object of the invention is to provide an injector according to the foregoing indications that is compact and simple and consequently is portable from one location to another with a minimum of difficulty.

Briefly, the invention may be described as a penetrating-fluid injector. Such injector comprises in combination a portable body member having a chamber therein for holding a predetermined quantity of said fluid. One end of said chamber is connected with means for securely attaching said body member to an access fitting. The injector also comprises a movable wall for said chamber to apply pressure to said penetrating-fluid, and spring means for biasing said movable wall toward said chamber. The injector additionally comprises means for increasing said bias spring force as said movable wall is moved away from said chamber.

Again briefly, the invention may be described as a self acting high pressure injector for use in freeing valves and the like having a lubrication fitting thereon. Such injector comprises a high strength cylindrical body having a coaxial hollow cylindrical chamber therein for receiving penetrating-fluid, and a pipe-threaded socket at one end of said body and coaxial with and openly connected to said chamber. The injector also comprises a piston with seal rings integrally supported thereon and located at one end of a cylindrical plunger. The said plunger is located coaxially within said body and extends out the other end thereof from said socket. The injector also comprises a stop collar integral with said plunger and limiting the travel of said piston within said chamber, and a high force coil spring surrounding said plunger and contacting said collar at one end of said spring. The other end of said spring is held in compression by a bushing attached to the other end of said body and surrounding said plunger. The injector additionally comprises a nut threadedly engaging the end of said plunger that extends out said other end of said body. The said plunger is threaded a predetermined distance to permit retraction of said piston for filling said chamber. Said injector also comprises a transverse groove in said plunger at the end cooperating with said nut in order to permit holding said plunger against rotation relative to said nut, and a passage connected with the socket end of said chamber for filling same. Also, the injector comprises a vent passage connected with the closed end of said chamber, and a plug means for closing both said last named passages after said chamber has been filled.

The foregoing and other objects and benefits of the invention will be more fully set forth below in connection with the best mode contemplated by the inventor of carrying out the invention, and in connection with which there are illustrations provided in the drawings, wherein:

FIG. 1 is a perspective, showing an injector according to the invention mounted for use on a lubrication fitting of a high pressure plug type valve that is schematically illustrated; and FIG. 2 is an enlarged longitudinal cross-section, showing in assembly the elements of an injector according to the invention.

It will be clear to anyone skilled in the art that an injector according to this invention may be employed in many and various ways and for various applications, e.g., wherever it is desired to inject a fluid under relatively high pressure for whatever purpose. However, it will be noted that the injector being described is especially adapted for use with plug type valves that are designed for high pressures and elevated temperatures, or other severe working conditions. In such a valve there are a number of working parts which involve use of packing and/or lubricants in order to provide leak proof operation for the valve.

In many applications where a valve like that described above is employed, the valve packing and lubricant become chemically hardened during the use of the valve in a system, particularly when it remains in either open or closed position for an extended period of time. Consequently, it becomes impossible to operate the valve when it is desired to change its operative condition.

Valves of the foregoing type are constructed with lubrication fittings for applying lubricant to the several lubricating and/or packing chambers that are located internally within the body of the valve. However, when the valve has become frozen due to excessive corrosion or chemical hardening of the lubricants and/or packing, the only way to make the valve operable once more is to remove it from service and dismantle it.

By employing an injector according to this invention, a penetrating-fluid may be applied under sufficient pressure to cause penetration throughout the lubricating chambers and/or the packing locations so that the rust or corrosion or chemical hardening may be counteracted and the valve parts freed for action once more. Of course, the penetrating-fluid might be manually injected under sufficient pressure to cause the desired softening and freeing of the valve parts, but the time required is on the order of several hours at a minimum. Consequently, by using an injector according to this invention, the fluid may be applied under sufficient pressure and for as long as necessary by merely attaching the tool with fluid therein and leaving it in place until the penetration of the fluid has been effectuated.

Referring to FIG. 1, it is to be observed that there is illustrated, in a partially schematic manner, an inverted plug type of valve 11 that is designed for high pressures, high temperatures, shocks and otherwise severe operating conditions. Such a valve includes a number of movable internal elements which must have packing and provide lubrication in order to withstand the severe conditions without leakage or otherwise failing to operate properly.

There are employed two lubrication fittings 12 and 16 for applying lubricant to the internal working parts. Fitting 12 is transversely located midway of the valve stem as shown, and the other fitting 16 is centrally located along the axis of a wrench square 15 that extends out the top of the valve. It will be understood, of course, that the square 15 is connected internally of the valve 11 for rotating the valve stem (not shown) and also the plug (not shown) connected thereto. The lubrication fitting 16 (on the wrench square 15) may take the form of a nipple with a pipe threaded extension vertically upward, to which the injector will be securely attached.

An injector 20 may be relatively small in size, since the amount of penetrating-fluid necessary to provide the desired loosening action is not particularly great. Consequently, an advantage of the injector tool is that it is readily portable and may be quickly attached by one man for applying the penetrating-fluid to a given valve. Also, thereafter when the fluid has completely penetrated, the tool may be readily removed and placed in another location, e.g. on the other fitting, or on another valve, or on any other machine part where the application of some penetrating-fluid under high pressure is to be desired. In this manner a given injecting tool may be moved from one location to another while the valves or other parts being freed may remain in use, and the personnel involved in applying the injector may be free for other duties following the brief time of attaching and filling an injector.

Referring to FIG. 2, the parts of an injector (which are shown substantially full size for a given tool according to the invention) will now be described. There is a high strength cylindrical body 22 that has a coaxial cylindrical chamber 23 therein. The chamber 23 connects directly with a pipe threaded socket 24 which is adapted to receive a pipe threaded fitting such as the fitting 16 which in turn includes a pipe threaded nipple or extension 25. This provides for a pressure-tight joint between the socket 24 of the tool 20 and the fitting 16 of the valve 11.

There is a plunger 28 that has a piston 29 integrally attached to the lower end (as viewed in FIG. 2) of the plunger 28. The piston 29 is formed by a plurality of expanding type rings 32 that are held in place between a ring or washer 33 and a V edged expander ring 34 that is pressed into contact with the piston rings 32 by means of a washer 35 which in turn is held in place by a round headed screw 37. Screw 37 screws into a threaded hole in the end of the plunger 28 as indicated by the dashed line showing. This arrangement creates an expanding action on the rings 32 to provide a tight seal under high pressure, between the piston 29 and the walls of the chamber 23.

Integral with the plunger 28 at the other end thereof from the piston 29, there is a larger diameter portion 38 and a stop collar 39 that rests against a shoulder 40 in the body 22 when the elements are in the position shown in FIG. 2. Surrounding the portion 38 of plunger 28, and within a hollow space 43 in the body 22, there is a heavy duty coil spring 44. Spring 44 rests against the collar 39 at one end thereof and when under compression tends to force the plunger 28 along with its integral collar 39, downward to an extended position for the piston 29 which will eject fluid from the chamber 23. Thus, the piston 29 acts as a movable wall for the chamber 23, that will apply pressure to a fluid therein.

Compression is applied to the spring 44 by a bushing 47 that has a hexagonal shoulder portion 48, and that screws into an internally threaded end 49 of the space 43. The remaining portion of the walls of space 43 is kept smooth, as is also the surface of the large diameter portion 38 of piston 28, in order to avoid abrasion and wear with respect to the spring 44 as it is compressed and expanded.

The free end of the portion 38 of plunger 28 extends out beyond the end of the body 22 (where bushing 48 is situated) and carries a nut 52 that is threaded thereon. The nut 52 will, of course, contact the surface of the bushing 48. Portion 38 is only threaded as far as necessary to be able to retract the piston 29 as far as required for fully opening the chamber 23, i.e., beyond a vent passage 53.

In order to accomplish the retraction of the piston 29, there is a milled slot or groove 54 in the end of the large diameter portion 38 of plunger 28. Thus, the plunger 28 may be held against rotation by use of a screw driver or the like inserted in the groove 54, while the nut 52 is turned for raising the plunger 28 by the thread action between a threaded portion 55 of the section 38 of the plunger and the internal threads of the nut 52.

It will be observed that as the plunger 28 is raised (when viewed as shown in FIG. 2) or retracted, it will cause the spring 44 to be compressed between the collar 39 and the bushing 47. This will potentially apply increased pressure on the piston 29 for action against fluid in the chamber 23. Of course, this pressure is not released so long as the nut 52 remains in contact with the bushing 48.

When the plunger 28 is retracted, e.g., to the dashed line position indicated, the chamber 23 may be filled with penetrating-fluid through a passage 57 that connects the inner end of the socket 24 (adjacent to the open end of chamber 23) with a threaded port 58 that is adapted for receiving a hexheaded plug 59. The port 58 is a radical opening in the body 22 of the tool. There is a similar threaded port 62 that receives another hexheaded plug 63 for closing the vent passage 53 when desired.

*Operation*

A typical operation of the injector 20 may be described in connection with both FIGS. 1 and 2, as follows. After mounting the injector 20 upon a lubrication fitting (with an adapter nipple e.g., fitting 16, if necessary) the injector will be prepared for filling with a fluid by first of all removing the plugs 59 and 63. Then a screw driver (not shown) or the like will be inserted in the groove 54 at the top of the plunger 28, and while thus holding the plunger against rotation, a wrench or the like will be applied to the nut 52. By rotating the nut 52 clockwise (assuming right hand threads), the plunger 28 and consequently the piston 29 will be raised so as to open the chamber 23 to provide space for insertion of an injection fluid.

Next, after the plunger and piston have been raised at least as far as the position indicated by dashed lines in FIGURE 2, the penetrating-fluid to be employed will be poured in through the port 58 and passage 57 into the socket 24 and the chamber 23. This will, of course, fill the space above the lubricant in the valve 11 that is located beneath the fitting 16. Consequently, this fluid will then fill the chamber 23 until it flows out through vent passage 53. This indicates that the whole chamber of the injector is full. Then the plug 63 will be screwed tightly back in place to create a pressure proof seal at the port 62. Likewise, the fill plug 59 will be screwed into place tightly for providing a pressure tight seal at the port 58.

The next step is to turn the nut 52 counterclockwise and thus release the plunger 28 under the force of the spring 44. The resulting condition is illustrated in FIGURE 1. The force of the spring 44 is thus allowed to act against the collar 39 and force the plunger 28, with the piston 29 at the lower end thereof, downward against the fluid in chamber 23. This applies the resulting pressure (which may be quite high because of the relatively small area of piston 29) on the penetrating-fluid within chamber 23 and consequently causes it to penetrate and act upon the hardened lubricant, or corroded conditions within the valve 11.

It will be appreciated that when the nut 52 is backed off to allow spring 44 to apply pressure on the plunger 28, it should be turned sufficiently to allow for a complete return of the plunger 28 back from the retracted position (that is indicated by the dashed lines in FIG. 2) to the fully extended position, i.e., that shown in full line illustration in FIG. 2. Thus, when most of the penetrating-fluid has been forced out of chamber 23 the plunger 28 will have returned to its fully extended position such that the collar 39 again rests against the shoulder 40 within the body 22 of the injector.

It is to be noted that an advantage of the injector tool according to this invention is that it may be placed in position, filled with penetrating-fluid and set to its operating position (all as generally described above) followed by leaving the tool and going to other activities while the penetrating-fluid is left under pressure to act upon the hardened lubricant or corroded surfaces within the valve. Since this action of the penetrating-fluid is apt to take somewhere in the neighborhood of three or four hours, the benefits of leaving it unattended are obvious. By merely observing the position of the plunger 28 (large diameter portion 38) it can be determined how far along the penetration has progressed. As soon as the plunger (and piston 29) has returned to its fully extended position (internally-relative to chamber 23) as indicated by the return of nut 52 to its position substantially in contact with the bushing 48, it will be indicated that the penetrating-fluid has been all injected and at least one portion of the valve 11 should be freed for reuse. Thereafter the injector tool 20 may be removed and employed elsewhere.

It will be appreciated that the injector 20 may be used at other lubrication fitting locations, e.g., the fitting 12 on valve 11. Of course, this may require an appropriate adapter (not shown).

It will be observed that among the advantages of an injector according to this invention, are the facts such as those noted above that it is a relatively small and readily portable tool which may be placed into operation and left to act over a period of hours followed by removal and use elsewhere as desired. Furthermore, the use of an injector of this type avoids much time, trouble and expense in connection with freeing a frozen valve which otherwise would have to be subjected to removal from the line and dismantling or at least application of high temperature by a torch. In either event there is much time as well as effort required and there is possible damage to the valve being treated.

While a particular embodiment of the invention has been described in considerable detail above, in accordance with the applicable statutes, this is not to be taken as in any way limiting the invention but merely as being descriptive thereof.

I claim:
1. A self acting high pressure injector for use in freeing valves and the like having a lubrication fitting thereon, comprising
   a high strength cylindrical body having a coaxial hollow cylindrical chamber therein for receiving penetrating fluid,
   a pipe-threaded socket at one end of said body and coaxial with and openly connected to said chamber,
   a piston with seal rings integrally supported on and located at one end of a cylindrical plunger,
   said plunger being located coaxially within said body and extending out the other end thereof from said socket,
   a stop collar integral with said plunger and limiting the travel of said piston within said chamber,
   a high force coil spring surrounding said plunger and contacting said stop collar at one end of said spring,
   the other end of said spring being held in compression by a bushing attached to the other end of said body and surrounding said plunger,
   a nut threadedly engaging the end of said plunger that extends out said other end of said body,
   said plunger being threaded a predetermined distance to permit retraction of said piston for filling said chamber,
   a transverse groove in said plunger at the end cooperating with said nut in order to permit holding said plunger against rotation relative to said nut,
   a passage connected with the socket end of said chamber for filling same,
   a vent passage connected with the closed end of said chamber, and
   plug means for closing both said last named passages after said chamber has been filled.

References Cited
UNITED STATES PATENTS

| | | | |
|---|---|---|---|
| 1,387,843 | 8/1921 | Fesler | 184—45 |
| 1,945,151 | 1/1934 | Marsh | 277—124 |

HOUSTON S. BELL, JR., *Primary Examiner.*

U.S. Cl. X.R.

184—1, 48, 105; 277—124